United States Patent [19]

Joyal

[11] Patent Number: 5,050,831

[45] Date of Patent: Sep. 24, 1991

[54] FAN MOUNTING CLAMP APPARATUS

[76] Inventor: Marc R. Joyal, 27 Getchell Ave., Woonsocket, R.I. 02895

[21] Appl. No.: 486,362

[22] Filed: Feb. 28, 1990

[51] Int. Cl.⁵ .............................................. A47F 5/00
[52] U.S. Cl. .................................. 248/208; 248/354.5
[58] Field of Search ............... 248/208, 209, 236, 551, 248/48.1, 48.2, 125, 354.5, 499, 500

[56] References Cited

U.S. PATENT DOCUMENTS

| | | | |
|---|---|---|---|
| 2,439,854 | 4/1948 | Lipski | 248/354.5 X |
| 2,542,369 | 2/1951 | Steendahl | 248/208 UX |
| 2,945,358 | 7/1960 | MacLeod et al. | 248/236 X |
| 4,118,902 | 10/1978 | Saxton | 248/551 X |
| 4,676,536 | 6/1987 | Arbic et al. | 248/354.5 X |

Primary Examiner—Ramon O. Ramirez
Attorney, Agent, or Firm—Leon Gilden

[57] ABSTRACT

Apparatus including an ungelating bracket in association with an upper wall of a fan housing. The bracket includes a first bar overlying the top wall of the housing with a rear projecting wall directed orthogonally upwardly from the support bar and a forward projecting bar directed downwardly from the support bar. A forward support plate is mounted orthogonally to a lower terminal end of the forward projecting bar and including a forward support projecting bar directed orthogonally upwardly from a forward terminal end of the forward support bar to capture a window sash directed downwardly into the forward support bar.

A modification of the instant invention includes a first U-shaped positioning member positioned for underlying a handle of the fan assembly with a semi-rigid strap directed forwardly of the first U-shaped positioning member and a first hook loop fastened patch surface mounted to a bottom surface of the semi-rigid strap adjacent a forward terminal end thereof. The first hook loop fastener surface is securable selectively to a second hook loop fastener surface formed on a exterior surface of a second U-shaped rigid member. The second U-shaped rigid member includes a first post telescopingly receiving a second post therewithin to position a window sash in a predetermined elevated orientation relative to the fan while simultaneously permitting capture of the semi-rigid strap within the second U-shaped support member when the window sash is in a lowered position.

1 Claim, 4 Drawing Sheets

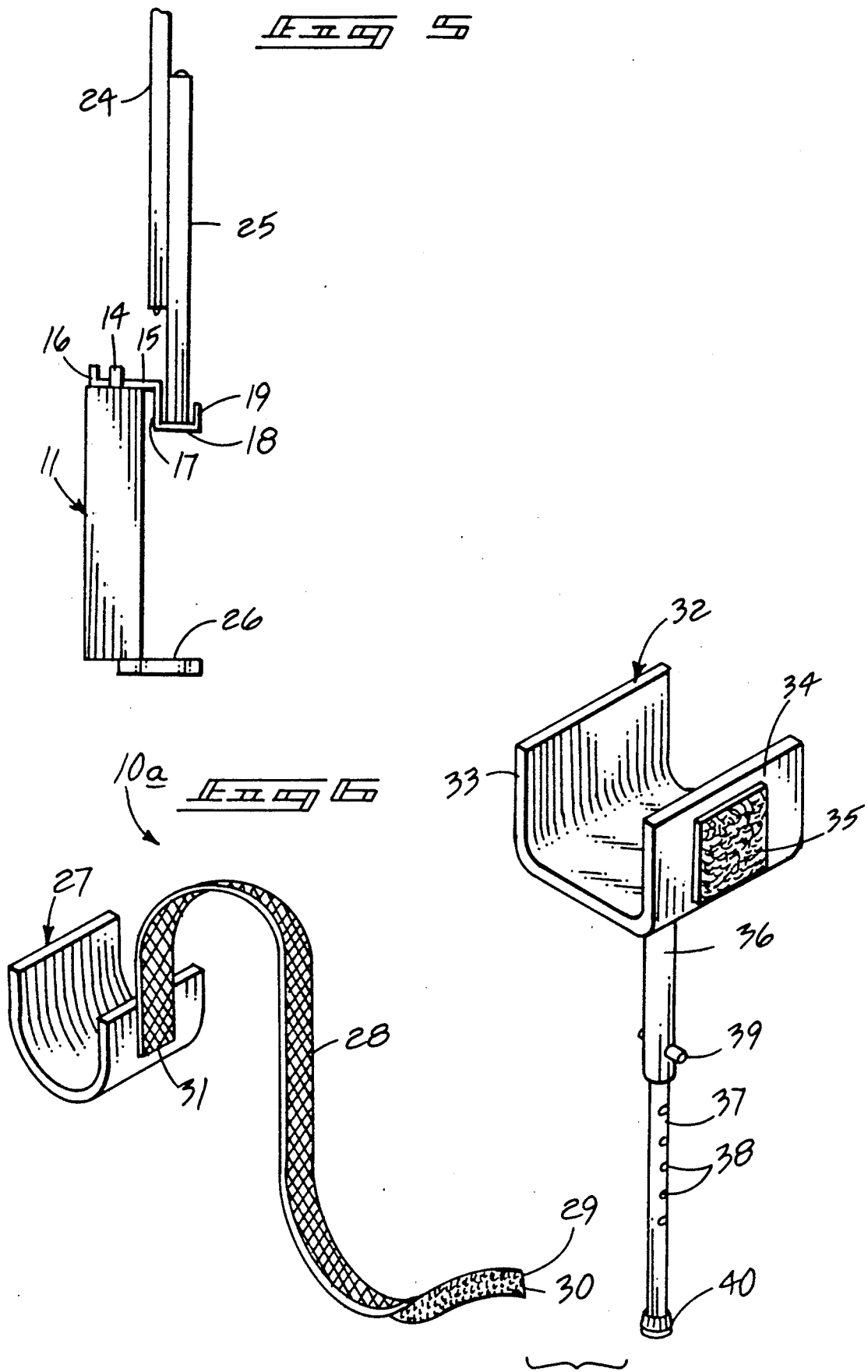

FAN MOUNTING CLAMP APPARATUS

BACKGROUND OF THE INVENTION

1. Field of the invention

The field of the invention relates to clamp structure, and more particularly pertains to a new and improved fan mounting clamp apparatus wherein the same permits securement and positioning of a portable ventilation fan on a window sill adjacent a vertically positionable window sash.

2. Description of the Prior Art

Clamp structures to mount and position various articles for ease of use by individuals is provided through the prior art. Heretofore however, the prior art has failed to provide a compact and readily utilized bracket association to permit securement of a portable ventilation fan on a typical window sill of limited width. Examples of the prior art clmp structures include U.S. Pat. No. 3,729,778 to MCGRATH providing an iron guard securable about a heating iron with the guard securable to opposed sides of an ironing board to secure the iron in a predetermined desired orientation during periods of non-use.

U.S. Pat. No. 1,286,649 to KAYSER sets forth a bottle holder wherein a clamp member is securable to a table surface with a projecting leg of the clamp member receivable within a belt loop to secure a bottle relative to the clamp member.

U.S. Pat. No. 3,981,471 to CURRIER provides a hanger organization for securement of various tubular components thereon wherein the hanger includes a resiliently biased V-shaped bracket receivable within a tubular work piece to clamp the tubular piece interiorly thereof the permit suspension of the tubular work piece from a support rack.

U.S Pat. No. 4,655,425 to WALLACE et al provides a cup holder provided with a frame attached to a base to permit encompassing of a cup with a strap adjusting from the frame to surroundingly clamp the cup thereto.

U.S. Pat. No. 2,625,727 to CHAPPEL set forth a clip for bicycle handle bars for securement of various articles relative to the handle bar structure.

As such, it may be appreciated that there continues to be a need for a new and improved fan mounting clamp apparatus as set forth by the instant invention which addresses both the problems of ease of use and efficiency in securement and positioning of a ventilation fan adjacent a vertically positionable window sash and in this respect, the present invention substantially fulfills this need.

SUMMARY OF THE INVENTION in view of the foregoing disadvantage inherent in the known types of clamp apparatus now present in the prior art, the present invention provides a new and improved fan mounting clamp apparatus wherein the same permits securement of a ventilation fan onto a window sill in association with a vertically adjustable window sash. As such, the general purpose of the present invention, which will be described subsequently in greater detail, is to provide a new and improved fan mounting clamp apparatus which has all the advantages of the prior art clamp organizations and none of the disadvantages.

To attain this, the fan mounting clamp apparatus of the instant invention includes apparatus including an ungelating bracket in association with an upper wall of a fan housing. The bracket includes a first bar overlying the top wall of the housing with a rear projecting wall directed orthogonally upwardly from the support bar and a forward projecting bar directed downwardly from the support bar. A forward support plate is mounted orthogonally to a lower terminal end of the forward projecting bar and including a forward support projecting bar directed orthogonally upwardly from a forward terminal end of the forward support bar to capture a window sash directed downwardly into the forward support bar.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fan mounting clamp apparatus which has all the advantages of the prior art fan mounting clamp apparatuses and none of the disadvantages.

It is another object of the present invention to provide a new and improved fan mounting clamp apparatus which may be easily and efficiently manufactured and marketed.

It is a further object of the present invention to provide a new and improved fan mounting clamp apparatus which is of a durable and reliable construction.

An even further object of the present invention is to provide a new and improved fan mounting clamp apparatus which is susceptible of a low cost of manufacture with regard to both materials and labor, and which accordingly is then susceptible of low prices of sale to the consuming public, thereby making such fan mounting clamp apparatuses economically available to the buying public.

Still yet another object of the present invention is to provide a new and improved fan mounting clamp apparatus which provides in the apparatuses and methods of the prior art some of the advantages thereof, while simultaneously overcoming some of the disadvantages normally associated therewith.

Still another object of the present invention is to provide a new and improved fan mounting clamp apparatus which may be compactly stored when not being utilized.

Yet another object of the present invention is to provide a new and improved fan mounting clamp apparatus wherein the same is securable adjacent a top wall of an associated ventilation fan to permit securement of the fan to an associated window sash assembly.

These together with the other objects of the invention, along with the various features of novelty which characterize the invention, are pointed out with particularity in the claims annexed to and forming a part of this disclosure. For a better understanding of the invention, its operating advantage and the specific objects attained by its uses, reference should be had to the accompanying drawings and descriptive matter in which there is illustrated preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic side view of the instant invention in association with a window sash assembly.

FIG. 6 is an isometric illustration of a modified fan mounting clamp apparatus of the instant invention.

DESCRIPTION OF THE PREFERRED EMBODIMENT

Figure 1:
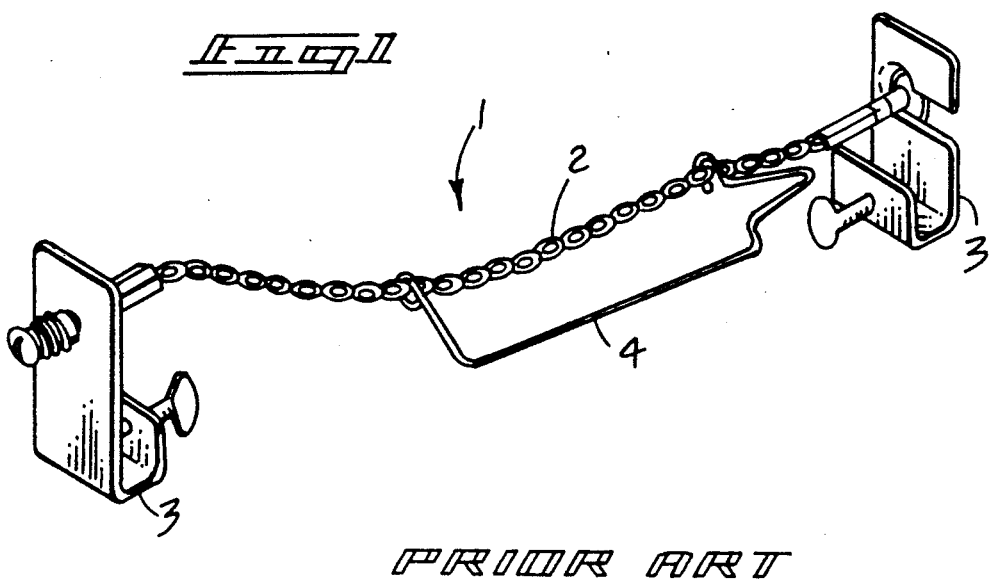
FIG. 1 is an isometric illustration of a prior art clamp apparatus.

With reference now to the drawings, and in particular to FIGS. 1 to 7 thereof, a new and improved fan mounting clamp apparatus embodying the principles and concepts of the present invention and generally designated by the reference numerals 10 and 10a will be described.

Figure 2:
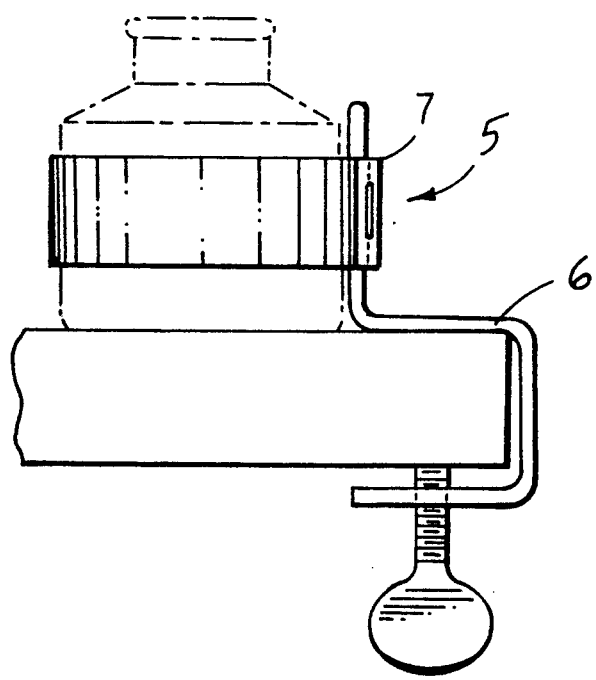
FIG. 2 is an orthographic side view taken in elevation of a further prior art clamp apparatus.
Figure 3:
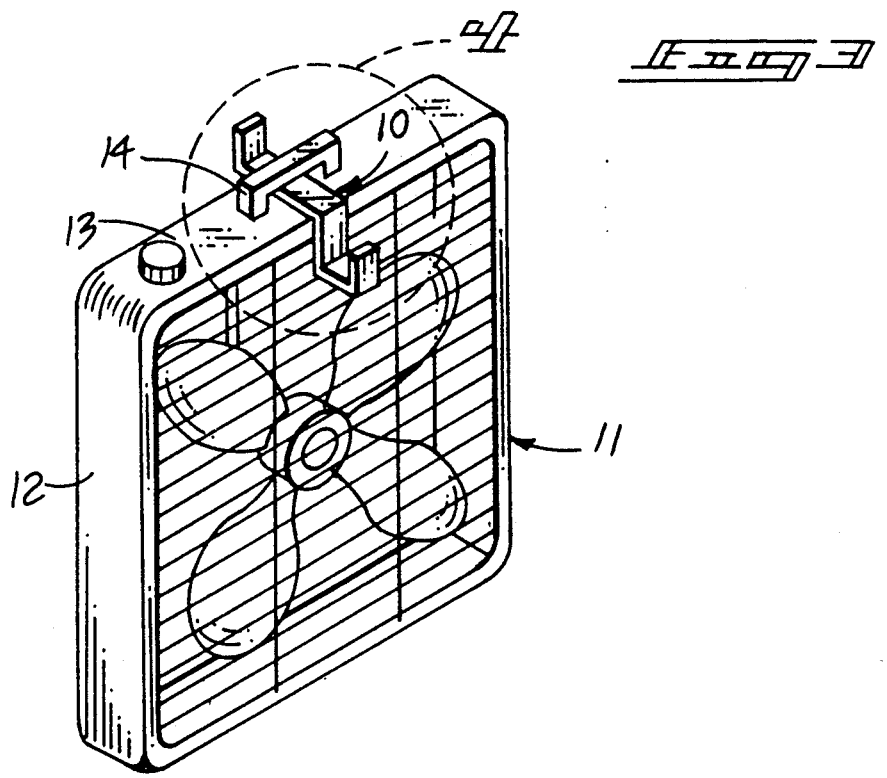
FIG. 3 is an isometric illustration of the instant invention.

FIG. 1 illustrates a typical prior art clamping apparatus 1 wherein spaced clamps 3 mount a flexible chain 2 therebetween with a wire loop 4 directed forwardly of the chain loop to receive an implement such as an iron therewithin for securing the iron when the clamps 3 are mounted to an ironing board. FIG. 2 illustrates a further prior art example of a clamp arrangement 5 wherein a bracket 6 is mounted to a support table with a loop 7 secured to an upper end of the bracket 6 to surroundingly secure a bottle of jar to the bracket member 6.

Figure 4:
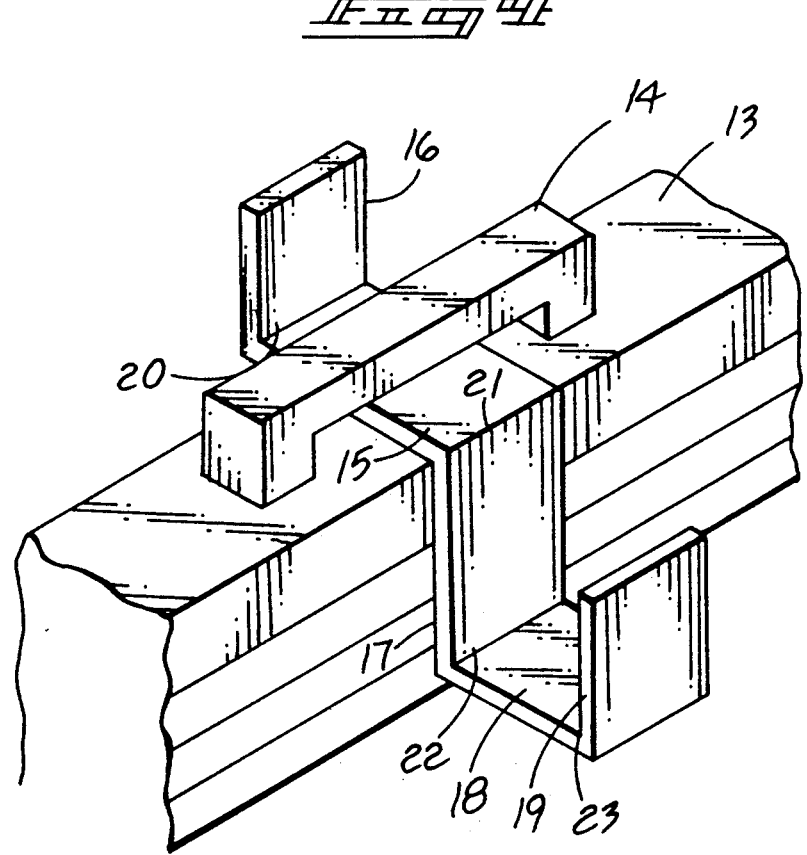
FIG. 4 is an isometric illustration of section 4 as set forth in FIG. 3.

More specifically, the fan mounting clamp apparatus 10 of the instant invention essentially comprises a combination with ventilation fan assembly 11 that is defined by a surrounding housing 12 with an impeller blade mounted medially thereof. The housing 12 includes a top wall 13 defined by a predetermined width with a U-shaped handle 14 mounted to the top wall 13 medially thereof and defines a slot between the handle and the top wall 13. The apparatus 10 essentially includes a central planar bar 15 including a rear terminal edge 20 and a forward terminal edge 21 aligned parallel relative to one another. The planar bar 15 is of a length substantially equal to or somewhat greater than the predetermined width of the top wall 13. A first projecting bar 16 is orthogonally mounted directed upwardly relative to the planar bar 15 at the rear terminal edge 20 thereof. A second projecting bar 17 is orthogonally and integrally mounted to the central planar bar 15 at the forward terminal edge 21 and projected downwardly thereof wherein the first and second projecting bars 16 and 17 are arranged parallel to one another projecting from opposed sides of the bar 15 as illustrated in FIG. 4. The second projecting bar 17 is orthogonally and integrally mounted at a rear edge of the forward support plate 18. The forward support plate as illustrated in FIG. 4, is arranged below and parallel to the planar bar 15. The forward support plate 18 further is defined by a forward edge 23. The forward edge 23, the rear edge 22 as well as the rear and forward terminal edges 20 and 21 respectively of the central planar bar 15 are all parallel to one another. A third projecting bar 19 projects orthogonally upwardly relative to the forward support plate 18 andd is of a predetermined height less than that of the second projecting bar 17 to define a U-shaped cradle therebetween. FIG. 5 illustrates the use of the clamp apparatus 10 wherein the central planar bar 15 is received within the slot defined by the handle 14 and the top wall 13 wherein the second projecting bar 17 is directed below the top wall 13 and receives a lower window sash 25 slidable relative to an upper window sash 24 within the cradle defined by the second and third projecting bars 17 and 19 respectively to secure the fan assembly 11 between the lower sash 25 and an upper surface of the window sill 26 to permit securement of a ventilating fan thereon regardless of limited width available in typical window sill construction.

Figure 7:
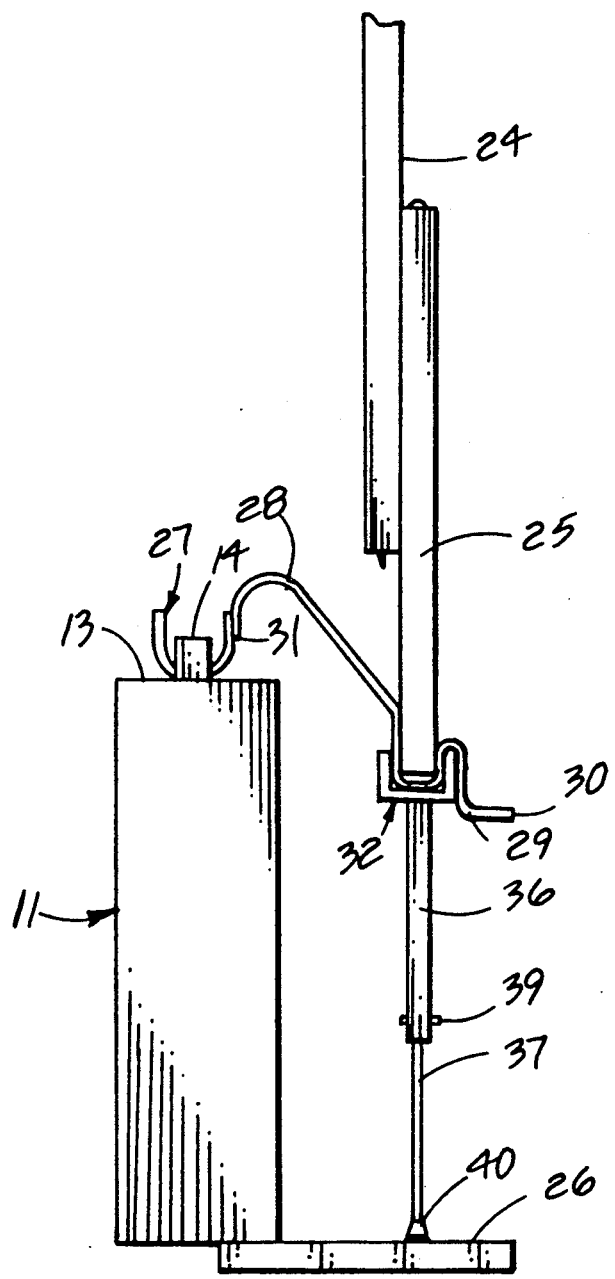
FIG. 7 is an orthographic side view taken in elevation of the modified fan mounting clamp apparatus in association with a window sash assembly.

FIGS. 6 and 7 illustrates a modified fan mounting clamp apparatus 10a wherein a first U-shaped rigid positioning member 27 fixedly mounts an elongate semi-rigid strap 28 thereto. The strap 28 is of a generally serpentine configuration and includes a rear terminal end 31 fixedly mounted to a forward exterior surface of the U-shaped member 27 with a forward terminal end 30 of the strap 28 including a first hook and loop fastener surface 29 formed on an interior surface of the strap 29. The first U-shaped rigid positioning member 27 is cooperative with a second U-shaped rigid positioning member 32 that includes spaced parallel legs including a first leg 33 and a second leg 34 wherein the second hook and loop fastener patch 35 formed on a exterior surface of the second leg 34. A first hollow post 36 is orthogonally mounted to a bottom surface of the second U-shaped member 32 and is directed orthogonally downwardly thereof in its securement to the floor of the second U-shaped member. A second post 37 is telescopingly received within the first post 36 wherein adjustment apertures 38 orthogonally directed through the second post 37 are alignable with a single alignment aperture pair and the first post 36 to receive a positioning pin 39 through the first post 36 and within one of the adjustment apertures 38 to permit adjustment of effective length of the first and second posts 36 and 37 in a secured relationship. A friction tip 40 is mounted to a lower terminal end of the second pot 37. In use, when the lower window sash 25 is directed downwardly, its spacing relative to an upper surface of a window sill 26 is adjustable to permit adjustment of a degree of ventilation directed between the lower sash 25 and the window sill 26 by adjustment of the second post 37 within the first post 36. The first U-shaped member 27 is directed within the slot defined by the handle 14 and the top wall 13 with the second U-shaped member 32 mounted underlying the lower sash 25 and capturing the semi-rigid strap 28 between a lower surface of the lower sash 25 and an upper surface of the second U-shaped member 32. The firt hook loop fastener patch 29 is accordingly secured to the second hook loop fastener patch 35 to insure anchoring and relative positioning of the first and second U-shaped rigid positioning members relative to one another to insure securement and positioning of the fan assembly 11 on the window sill 26.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is now desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fan mounting clamp apparatus in combination with a ventilation fan assembly wherein the fan assembly includes a surrounding housing including a top wall, and
   a "U" shaped handle mounted onto the top wall defining a slot between the handle and an upper surface of the top wall, and
   a first support means mounted within the slot for underlying securement of the handle and securement of the fan assembly, and
   a second support means spaced forwardly of the first support means for securement of a window sash therewithin, and
   an elongate securement member securing the first and second support means together, and
   wherein the first support means is defined by a first "U" shaped rigid positioning member, the first rigid "U" shaped positioning member including a rear and forward leg and the elongate securement member including a serpentine elongate semi-rigid strip, the semi-rigid strip integrally mounted to the forward leg of the first "U" shaped rigid positioning member and a rear end of a semi-rigid strip, and a first hook and loop fastener surface mounted to a bottom surface of the semi-rigid strip adjacent a forward terminal end of the semi-rigid strip, and the second support means including a second "U" shaped rigid positioning member, and
   wherein the second "U" shaped rigid positioning member includes a first leg spaced from and parallel a second leg and a floor connecting the first and second legs together, and a second hook and loop fastener patch mounted to an exterior surface of the second leg, and a first post integrally and orthogonally mounted to a bottom surface of the floor, and the first post telescopingly receiving a second post therewithin, and the second post including adjustment apertures cooperative with the positioning pin directed through the first positioning post to vertically adjust the second post relative to the first post, and a friction tip mounted to a lower terminal end of the second post, and the first hook and loop fastener patch securable to the second post, and the first hook and loop fastener patch securable to the second hook and loop fastener patch when the first "U" shaped rigid positioning member is directed through the slot and the second "U" shaped positioning member is positioned underlying a window sash to secure the fan assembly between the window sash and an upper surface of an underlying window sill.

* * * * *